Patented Dec. 10, 1929

1,739,032

UNITED STATES PATENT OFFICE

EMMET F. HITCH, HENRY JORDAN, AND AUBREY O. BRADLEY, OF WILMINGTON, DELAWARE, ASSIGNORS TO E. I. DU PONT DE NEMOURS & COMPANY, OF WILMINGTON, DELAWARE, A CORPORATION OF DELAWARE

DISAZO DYE AND PROCESS OF PREPARING THE SAME

No Drawing.  Application filed January 18, 1927.  Serial No. 161,952.

This invention relates to disazo dyes, more particularly it relates to new disazo dyes which contain two —NH.CO— groups and the process of preparing the same.

The object of the invention is to produce new disazo dyes adapted to dye on either animal or vegetable fibers shades of remarkable fastness to washing and to light. A further object is to produce dyes which, in addition to being fast, have excellent tinctorial power.

The new dyes may be represented by the general formula:

where $R$, $R_1$, and $R_2$ represent aromatic radicals without a hydroxyl, amino or substituted amino group attached to the nucleus, and $R_3$ represents an aliphatic or an aromatic radical or a substituted aliphatic or aromatic radical, such as for example, methyl, ethyl, phenyl, nitro phenyl, hydroxy phenyl or carboxy phenyl.

Broadly stated, the process of preparing the new dyes involves diazotizing an aromatic amino compound, coupling the diazo body to an aromatic compound which contains an amino group, but contains no hydroxyl group attached to the nucleus, treating the amino azo compound with nitro benzoyl chloride, reducing the nitro group of this condensation product, diazotizing the amino-benzoyl amino azo compound, coupling this diazo body to an aromatic compound which contains an amino group but contains no hydroxyl group attached to the nucleus, and then treating with a carboxylic compound adapted to condense with the resulting amino disazo compound and form herewith a product containing two acyl groups. In case the diacyl compound thus obtained contains an amino group, it may be diazotized on the fiber and coupled to any suitable component.

The new dye compounds and their preparation can best be disclosed by the presentation of a number of examples of actual embodiments thereof. It is to be understood, of course, that these examples are furnished below by way of illustration only, and that the details of procedure specified and therein disclosed are susceptible of variation and substitution.

Example 1

303 parts of 2-naphthylamine-6:8-disulphonic acid are diazotized in the usual way. To the diazo compound there are added 107 parts of m-toluidine dissolved in dilute hydrochloric acid; the mineral acidity is then neutralized with sodium acetate. After three to four hours stirring at 20–25° C. the coupling will be complete. After acidifying with hydrochloric acid the amino azo compound is salted out and filtered. The paste is stirred up with 5000 parts of water and dissolved with 40 parts of sodium hydroxide. 53 parts of sodium carbonate are now added and the solution is heated up to 80–85° C., when 186 parts of p-nitrobenzoyl chloride are added with rapid agitation. The condensation takes place practically immediately, the condensation product being mostly precipitated out. In order to reduce the nitro-benzoyl compound there is added at 85–90° C. a solution of 117 parts sodium sulphide ($Na_2S$). The reduction will be complete after 10–15 minutes stirring. The amino-benzoyl compound, most of which will be in solution, is precipitated out with salt and filtered. The paste is stirred up again with 6000 parts of water, acidified with 280 parts of a 31% hydrochloric acid solution and diazotized at 25–30° C. by the addition of 69 parts of sodium nitrite. After two to three hours stirring the diazotization will be complete. To the diazo compound there is now added again a solution of 107 parts of m-toluidine in dilute hydrochloric acid and the mineral acidity is neutralized with sodium acetate. The mixture is allowed to stir six to eight hours at 25–30° C., when the coupling will be complete. The charge is now made alkaline with sodium carbonate, heated up to 70° C., precipitated with salt, and filtered. This amino disazo dye is soluble in water with a reddish-orange color, but is very sensitive to acid. In order to convert it into the benzoyl derivative the paste is dissolved in 10000 parts of water at 30–35° C. 53 parts of sodium carbonate and thereafter 141 parts of benzoyl chloride are added and the mixture is strongly agitated for about one hour. The color of the solution changes slowly from a reddish-orange to a bright yellow which does not change on spotting with acid. The dye is salted out and filtered. In its dry ground form it is an orange powder, soluble in water with a bright yellow color, soluble in concentrated sulphuric acid with a bright scarlet color. It dyes cotton in bright yellow shades which show good fastness to washing and an excellent fastness to light. Cotton-silk fiber is dyed in very uniform shades. Hydrosulphite will discharge the dye to a pure white. The dye has most probably the following formula:

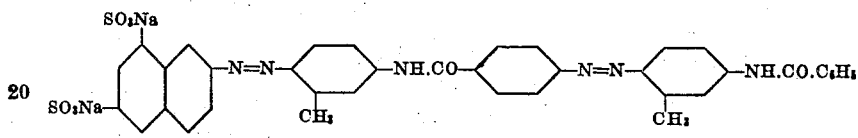

Using 102 parts acetic anhydride instead of 141 parts of benzoyl chloride in the last condensation the corresponding acetyl derivative will be obtained which shows slightly redder shades than the benzoyl compound. The properties of the dye are similar.

Using 186 parts of p-nitro-benzoyl chloride at 80–85° C. instead of benzoyl chloride, the p-nitro-benzoyl derivative will be obtained, which shows again similar properties to the benzoyl compound. This nitro-benzol derivative may be reduced and thus converted to the p-amino-benzoyl derivative. When dyed as a direct color it gives shades similar to the nitro-benzoyl and benzoyl derivatives. The dyeings may be diazotized on the fiber and developed. The beta-naphthol developed dye shows a bright yellowish-orange of an excellent fastness both to washing and to light; the pyrazolone development gives a bright yellow of similar properties. All dyeings will discharge to a pure white with hydrosulphite. The amino-benzoyl dye will most probably have the following formula:

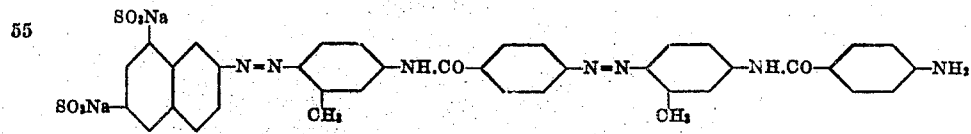

*Example 2*

Using instead of 303 parts of 2-naphthylamine-6:8-disulphonic acid 173 parts of p-sulphanilic acid, coupling this to m-toluidine, condensing with p-nitro-benzoyl chloride and reducing with sodium sulphide as shown in Example 1, then diazotizing the amino-benzoyl compound and coupling it to 223 parts of 1-naphthylamine-6-sulphonic acid in the presence of sodium acetate, an intermediate dye is obtained which in the form of its sodium salt is soluble in water with a bluish-red coloration. This dye is dissolved in 10000 parts of water at 80–85° C., and after adding 53 parts of sodium carbonate condensed with 186 parts of p-nitro-benzoyl chloride, the nitro benzoyl derivative is then reduced at 85–90° C. with 117 parts of sodium sulphide and the amino-benzoyl derivative is salted out. This dye is soluble in water with a yellowish coloration; in concentrated sulphuric acid it gives a Bordeaux coloration. It dyes cotton in yellowish-orange shades, which may be diazotized and developed on the fiber. The beta-naphthol developed shade is an orange-brown; the pyrazolone shade is a bright yellowish-brown. All dyeings show an excellent fastness to light; the developed dyeings in addition to this are very fast to washing. This dye has most probably the following formula:

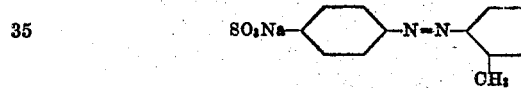
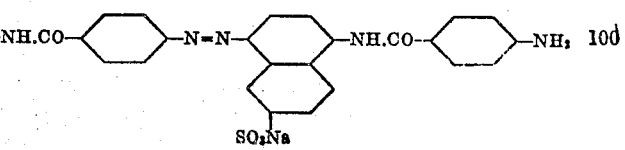

*Example 3*

303 parts of 2-naphthylamine-6:8-disulphonic acid are diazotized in the usual way. This diazo compound is added to a solution of 223 parts of 1-naphthylamine-6-sulphonic acid in 3000 parts of water and 53 parts of sodium carbonate, containing sufficient sodium acetate to neutralize the mineral acid. The coupling will be complete in a few minutes at a temperature of 15–20° C. The intermediate amino azo dye is in solution and can not be salted out. The litmus acidity is neutralized with sodium hydroxide, and after the neutral reaction has been reached there are added 53 parts of sodium carbonate. The temperature is raised to about 85° C. and 186 parts of p-nitro-benzoyl chloride are now added while agitating strongly. The nitro-benzoyl compound is salted out and filtered. The reduction, further diazotization, coupling to m-toluidine, and condensation with benzoyl chloride are carried out as described in Example 1. The shade of the benzoyl compound is slightly redder than the dye of Example 1. On cotton-silk fiber it dyes silk weaker than cotton. The fastness properties are similar to those of the dye in Example 1. The dye has most probably the following formula:

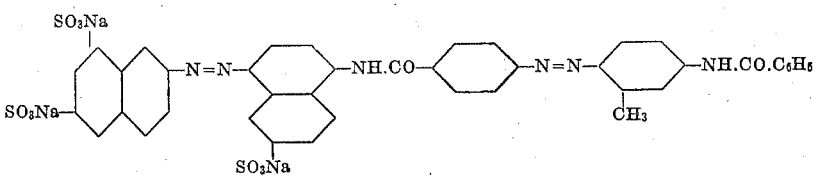

The corresponding p-amino-benzoyl compound instead of the benzoyl derivative shows on direct dyeings a similar shade to the benzoyl dye; the beta-naphthol developed dyeings show bright yellowish-orange shades; the pyrazolone developed shades are bright yellows.

Among other compounds which may be used as first components in addition to those named in the examples may be mentioned:— metanilic acid, aniline-disulphonic acid, the toluidine sulphonic acids, the naphthylamine sulphonic acids 2-naphthylamine-4-:8-disulphonic acid, 2-napthylamine-3:6 and 3:8-disulphonic acids.

Among other compounds which may be used as second and third components in addition to those named in the examples may be mentioned:—aniline, para-xylidine, o-anisidine, alpha-naphthylamine, and 1-naphthylamine-7-sulphonic acid.

It is apparent that, where the term radical is employed in the appended claims, either a substituted or an unsubstituted radical may be indicated.

We claim:

1. A dye compound comprising the group:

$$R-N=N-R_1-NH.CO.C_6H_4-N=N-R_2-NH.CO.R_3$$

in which R, R$_1$, and R$_2$ represent aromatic radicals having neither a hydroxy nor an amino group attached to the nucleus and CO.R$_3$ represents an acyl radical.

2. A dye compound comprising the group:

$$R-N=N-R_1-NH.CO.C_6H_4-N=N-R_2-NH.CO.R_3$$

in which R, R$_1$, and R$_2$ represent aromatic radicals having neither a hydroxyl nor an amino group attached to the nucleus and R$_3$ represents an aromatic or an aliphatic radical.

3. The compound set forth in claim 2, wherein the disazo group $$R-N=N-R_1-NH.CO.C_6H_4-N=N-R_2$$

contains at least one sulphonic acid group.

4. The compound set forth in claim 2, wherein the disazo group $$R-N=N-R_1-NH.CO.C_6H_4-N=N-R_2$$

contains two sulphonic acid groups.

5. The compound set forth in claim 2 wherein the azo group $R-N=N-R_1$ contains at least one sulphonic acid group.

6. The compound set forth in claim 2 wherein the groups represented by R and R$_1$ each contain a sulphonic acid group.

7. The compound set forth in claim 2 wherein the groups represented by R and R$_2$ each contain a sulphonic acid group.

8. The compound set forth in claim 2, wherein the groups represented by R$_1$ and R$_2$ each contain a sulphonic acid group.

9. The compound set forth in claim 2, wherein R$_3$ represents an amino compound.

10. The compound set forth in claim 2, wherein R$_3$ represents an aromatic amino compound.

11. The process of preparing a dye compound which comprises diazoting an amino-benzoylamino-azo compound containing no hydroxyl group or other free amino group attached to the nucleus, coupling the resulting diazo body to an aromatic compound containing an amino group but not containing a hydroxyl group and treating the resulting amino disazo compound with a carboxylic compound adapted to condense therewith and form a product containing an acyl group.

12. The process set forth in claim 11, wherein the amino-disazo compound contains at least one sulphonic acid group.

13. The process set forth in claim 11, wherein the amino-disazo compound contains at least two sulphonic acid groups.

14. The process set forth in claim 11, wherein the amino-benzoylamino-azo compound contains two sulphonic acid groups.

15. The process set forth in claim 11, wherein the carboxylic compound is an aryl compound.

16. The process set forth in claim 11, wherein the carboxylic compound is an aryl nitro compound.

17. The process set forth in claim 11, wherein the carboxylic compound is nitro-benzoyl chloride and the nitro group of the resulting product after the condensation is reduced to an amino group.

In testimony whereof we affix or signatures.

EMMET F. HITCH.
HENRY JORDAN.
AUBREY O. BRADLEY.